United States Patent [19]
Kuiken

[11] Patent Number: 4,744,263
[45] Date of Patent: May 17, 1988

[54] FACE GEAR TRANSMISSION

[75] Inventor: Hendrik Kuiken, Emmeloord, Netherlands

[73] Assignee: Kuiken, N.V., Emmeloord, Netherlands

[21] Appl. No.: 936,241

[22] Filed: Dec. 1, 1986

[30] Foreign Application Priority Data

Dec. 5, 1985 [NL] Netherlands .................. 8503359

[51] Int. Cl.$^4$ ............... F16H 55/06; F16H 55/08; F16H 55/10; F16H 55/17
[52] U.S. Cl. .................................. 74/462; 74/460; 74/457
[58] Field of Search ............. 74/457, 458, 460, 462, 74/416, DIG. 12; 29/159.2

[56] References Cited

U.S. PATENT DOCUMENTS

| 1,755,102 | 4/1930 | Croft | 74/459.5 |
| 3,184,988 | 5/1965 | Osplack et al. | 74/457 |
| 4,238,970 | 12/1980 | Carter | 74/457 |
| 4,651,588 | 3/1987 | Rouverol | 74/462 |

FOREIGN PATENT DOCUMENTS

| 1230462 | 9/1960 | France | 74/458 |
| 2378989 | 8/1978 | France | |
| 749404 | 5/1956 | United Kingdom | |
| 1391932 | 3/1972 | United Kingdom | 74/457 |

OTHER PUBLICATIONS

IBM Technical Disclosure Bulletin, vol. 19, No. 1, Jun. 1968, blz. 32, New York, U.S.; Crutcher et al.: "Spiral Crown Wheel and Circular Toothed Pinion".
Technische Rundschau, vol. 50, No. 1, Jan. 1958, blz. 17, Hallwag Verlag, Bern, CH; A. Muller: "Kronradgetriebe", *FIG. 6a.*

Primary Examiner—Lawrence J. Staab
Assistant Examiner—S. J. Anchell
Attorney, Agent, or Firm—Wegner & Bretschneider

[57] ABSTRACT

Face-gear transmissions have been used hitherto only for secondary applications, with little running hours and low loads. They form a type of underdeveloped angle transmissions. When analyzing said underdevelopment, it was surprisingly found that well-known gear theory had not been applied correctly. Especially the teeth-tip-height can be increased considerably in the region where the face-gear teeth have increased pressure angles, resulting in considerably increased loading capacity and meshing quotient, all based on meshing cooperation with standard cylindrical gears with either straight (spur) or helical teeth. The angle between the transmission shafts may be 90°, less or over, the shafts may intersect or cross. In case involute toothing is chosen for the cylindrical gear wheel, all well-known advantages remain valid, thus alignment of the transmission is considerably less critical than with bevelled transmissions, axial-pinion loads are less or absent, loading capacity is comparable or better and transmission ratios surpassing approximately 1:5 become the more attractive. In many cases less transmission steps will be possible, reducing size and cost. Simple replacement becomes possible, without any alignment problems. Face gear transmission now may be used for primary, high load, long-life industrial applications.

7 Claims, 2 Drawing Sheets

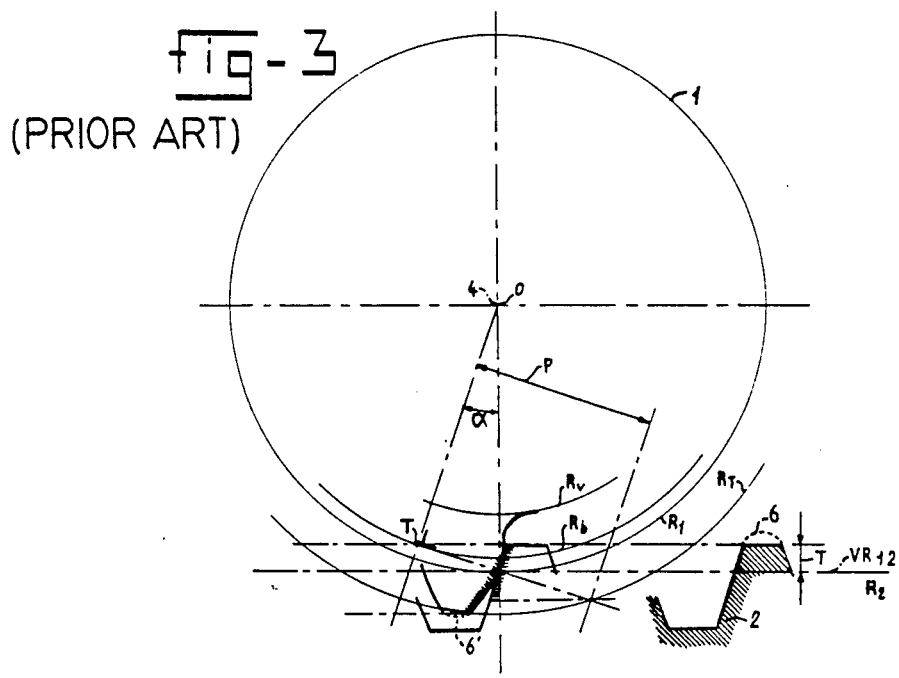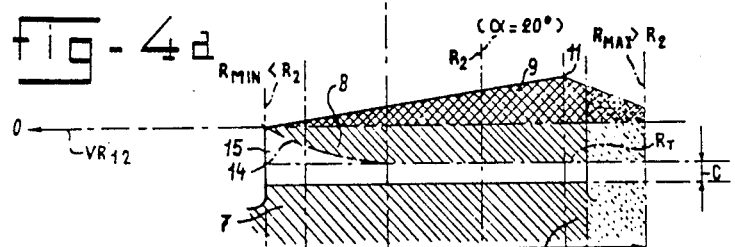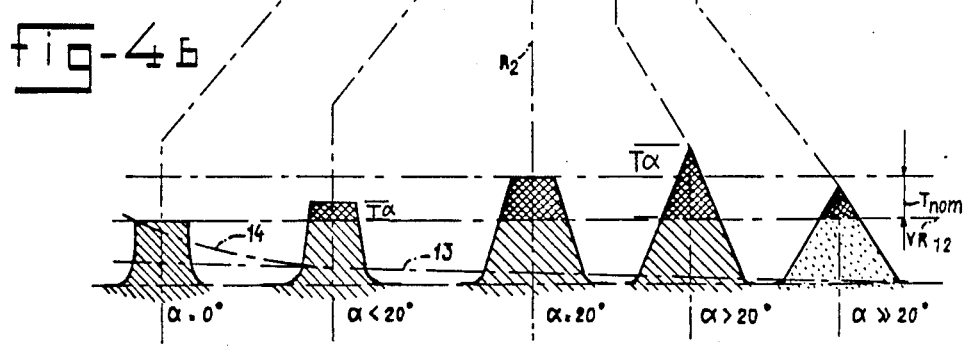

FACE GEAR TRANSMISSION

The invention relates to a face gear transmission for axes intersecting or crossing each other, whether at an angle of 90° or not, comprising a cylindrical gear wheel, with straight or helical toothing, which engages a face gear, the active tooth flanks of which have a varying active pressure angle $\alpha$ which varies between approximately $\alpha=0°$ at the inside of the face gear teeth and approximately $\alpha=40°$ at the outside, on radii measured on the (theoretical) reference cone and viewed in a plane perpendicular to the axis of the engaging cylindrical gear wheel.

Face gears of this type with a constant tooth height are in practice often used for lightly loaded drives such as encountered in toys, instruments, hobby tools, etc., which are generally designed for a small number of operating hours. For true power drives such as, for example, for powers above a few kW to thousands of kW and thousands of full-load operating hours, face gears are little used in practice. One of the reasons for this is that for transmission ratios of $i=1$ to approximately $i=3-3.5$ the active tooth width of the face wheels is very limited so that relatively little power can be transmitted. On the other hand, in bevelled gear drives the tooth width may be chosen independently of the transmission ratio so that in power drives the transmission ratio may be freely chosen between $i=1$ and the value of i which is still feasable on standard bevel-gear generating cutter- or -hobbing machines, which is a maximum of $i=6-7$. It is only above a transmission ratio of approximately 1 to 4-5 and a diameter of the face wheel above approximately 600 mm that the cost price of a face wheel drive approaches that of the usual bevel gear drives. In particular, special bevel gear drives such as hypoid drives, have captured an important market share for high loads because, inter alia, it is possible for them to have advantages with crossing axes.

This also emerges from the fact that in the known handbooks such as thay by G. Nieman and H. Winter entitled Machinen-elemente (Machine components), volume 3, published by Springerverlag, 1983, only half a page is devoted to face gear drives. Furthermore it appears that this short chapter is inspired by a known US Handbook entitled "Gear Handbook" by Dowel W. Dudley, 1st Edition, McGraw-Hill, 1962. Even the figures have been copied. In the US Handbook entitled "Analytical Mechanics of Gears" by Earl Buckingham, McGraw-Hill, 1949, though more pages (312-320) are devoted to face gear drives, even in this publication there is little fundamental theory and mainly computational approximations are presented for determining the tooth shape and the loading capacity.

Due to the fact that the face gear under consideration has to engage with a cylindrical gear wheel, it can in principle be manufactured by generating-hobbing with a hobbing-cutter wheel having a toothing which corresponds to that of the gear wheel and having the same number of or a few more teeth than the gear wheel. Buckingham therefore speaks of "Fellows face gears". These specialists write that kinematically a bevelled gear drive is involved in which the use of the cylindrical gear wheel has the result that the face gear acquires an adendum modification over its tooth width, which means that the active pressure angle $\alpha$ varies over the tooth width. In principle line-contact is provided between the tooth flanks of the gear wheel and the face gear, the generating (or enveloping) lines of the generating (reference) come all passing through the point of intersection of the rotation centre lines 0. It is surprising, however, that flat face gears are depicted or named in all three publications and in the figures. Nieman: "Face gear with constant tooth height".

Because the active tooth width of the face gear virtually cannot extend further in the direction of the centre line of the face gear than to a radius at which the local pressure angle becomes equal to $\alpha=0$, the tooth height has to be kept limited at that point for the same reasons. No undercutting thus needs to be made in the tooth base of the cylindrical gear wheel because no use could otherwise be made of a standardized gear wheel, for example, with involute toothing. The consequence of this is, however, that on the face gear, in particular at the point where the pressure angle is small, only a very limited part of the surface of the tooth flanks effectively participates in the power transmission. This of course constitutes an important disadvantage compared with the known bevelled gear drive and hypoid drives. However, because face gear drives using a cylindrical gear wheel have attractive properties per se, it makes sense to attempt to make improvements at the point of the small active tooth surface. Of said properties it may be mentioned that absolutely no axial loading is excerted on the gear wheel in operation (with straight (spur) toothing) in contrast to the sometimes large to very large axial loadings in corresponding bevel gear- or hypoid drives. In addition, an attractive property of the involute toothing is retained, viz. that the depth of engagement of the teeth of the cylindrical wheel in those of the face gear is less critical than in the case of bevelled gear drives, while an axial displacement of the wheel with respect to the face gear is not at all detrimental.

The feared alignment problems in the assembly, known from gear boxes for bevelled gear drives and hypoid drives are thereby avoided to a considerable extent, while the manufacturing accuracy also imposes less severe requirements in a number of coordinate directions. In order, therefore, to reduce the disadvantages of face gear drives described above it is proposed according to the invention that the tooth tip height of the face gear, measured from the plane which is situated perpendicular to the axis of rotation of the face gear and over which the pitch cylinder having the pitch radius of the cylindrical gear wheel rolls, has a varying value, the tip height decreasing substantially linearly from the nominal pitch radius as the radius decreases and increasing as the radius increases, and, as the radius increases further, the tip being sharp and then decreasing again, all this in a manner such that at radii less than the nominal pitch radius no undercutting of the tooth base of the gear wheel is necessary and a standard cylindrical wheel can therefore continue to be used, and that at radii larger than the nominal pitch radius a considerably increased load carrying tooth flank can be used with increased meshing quotient in the region where the tooth base is also strengthened due to the increased pressure angle $\alpha$.

This achieves the result that at larger radii in particular the effective bearing surface of the tooth flanks is considerably increased and as a result of this the total mean flank loading, and consequently the wear decreases and/or a higher loading capacity of the drive becomes possible at the same time. The considerably increased meshing quotient to the high value of approximately 2.5 produces a markedly smoother and less noise producing operation even in the case of straight toothing. As regards the teeth of the face gear, the loading which shifts to larger radius is active at that point on the teeth where the pressure angle $\alpha$ has increased and the tooth therefore has a very strong tooth base and shape. As regards the gear wheel engaging with it, the added effective bearing flank section of the face gear teeth is situated in the region of the tip of the face gear teeth and is therefore active in the region near the base of the teeth of the gear wheel. At least as regards the bending load, this is the point at which the teeth of a gear wheel in general have a comnfortably higher loading capacity without experiencing difficulties with the fatigue strength. All things considered, the loading capacity of a face gear drive has increased by some percentage decades due to the invention. It will be clear to those skilled in the art that said percentage is affected, inter alia, by the effective width chosen of the teeth with respect to the pitch circle radius of the face gear. To avoid possible misunderstandings, all the above is concerned with cylindrical toothing for the gear wheel, both straight (spur) and helical.

A further explanation of the above and of the invention follows below on the basis of the description of the attached figures and diagrams.

FIG. 3 shows diagrammatically some gear wheel theory on which the invention is based;

FIG. 4a shows diagrammatically the tooth shape of the face gear according to the invention in side view and at various points over the tooth width in cross section.

FIG. 4b shows diagrammatically the tooth shape of the face gear;

Figure 1:
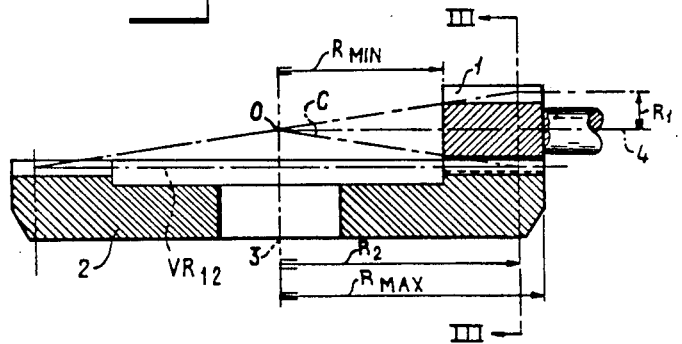
FIG. 1 shows a cross section through a known face gear drive and, in particular, of the plane passing through the two axes which intersect each other at right angles.
Figure 2:
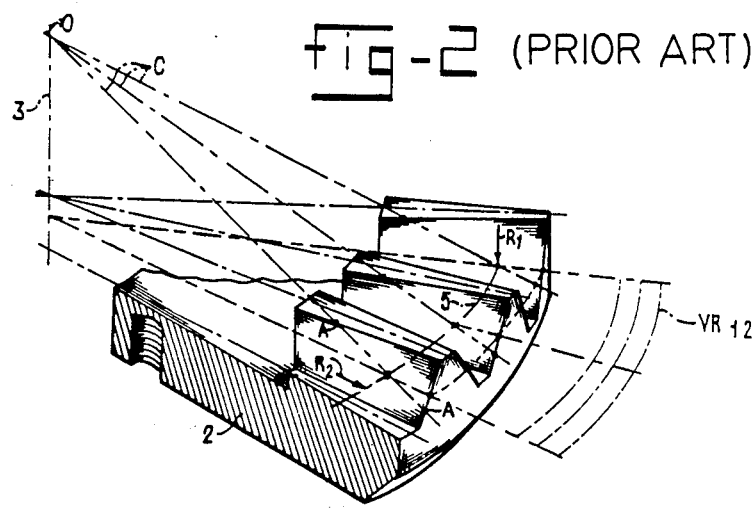
FIG. 2 shows a toothing of the known face gear in FIG. 1.

Although FIGS. 1 and 2 are known per se from the above named book by Nieman, they have nevertheless been included here because they form the starting point for the explanation of the invention. The cylindrical gear wheel 1 rotates about an axis 4. In the figures said axis 4 intersects the axis 3 of the face gear 2 at an angle of 90°. The special toothing which is produced on the face gear as a result is shown on an enlarged scale in FIG. 2. It should be pointed out that all the abovementioned and undermentioned is also basically valid for helical toothing, axes which cross each other and also for axes which cross each other or intersect at an angle other than 90°. For the purpose of simplicity and clarity, however, the inventon is explained on the basis of the simplest example, viz. a face gear drive with straight (spur) toothing and axes which intersect each other at 90°. The lines C indicate the reference cone generating (enveloping) lines, the apex of which is located at the origin 0, where the axes 3 and 4 intersect each other. As can be seen from the figures, this generating surface passes through the line of intersection of the working pitch circle 5 on the face gear 2, where the pitch circle $R_1$ of the cylindrical gear wheel rolls absolutely mathematically over the pitch circle having the radius $R_2$ of the face gear. The working pitch circle 5 and the pitch circle $R_2$ of the face gear are situated in the plane $VR_{12}$ which is perpendicular to the axis 3 of the face gear. Pure rolling also takes place where the theoretical generating (reference) cone surface intersects the tooth flanks of the engaging toothings, i.e. on the lines A—A in FIG. 2. However, since the gear wheel 1 has a cylindrical toothing, a "roll correction" has to be made in the case of the face gear in the form of a pressure angle $\alpha$ varying over the width of the tooth of the face gear. This can be clearly seen in FIG. 2. At the point where the pitch circles $R_1$ of the gear wheel 1 and $R_2$ of the face gear 2 touch each other, the teeth of the face gear have a profile precisely corresponding to that of the gear wheel 1 such as is present over the entire width of the spur gear. At a radius smaller than $R_2$ of the face gear the pressure angle $\alpha$ will become smaller as a result of the "roll correction" and it may decrease to 0. For practical reasons $\alpha = 0$ will be the limiting value because the base circle $R_b$ (FIG. 3) then becomes equal to the pitch circle $R_2$ and an involute tooth flank can no longer exist. At a radius greater than $R_2$ the pressure angle $\alpha$ of the toothing of the face gear will be larger than that of the spur gear. As a result the face gear teeth become more pointed at a radius greater than $R_2$ and acquire a stronger tooth base, which leads to increasing tooth strength at that point. The maximum radius $R_{max}$ is in this case determined by the tooth tip becoming sharp and if $R_{max}$ becomes still greater, by a decreasing tooth height and a pressure angle $\alpha$ which increases still further. If a standardized pressure angle $\alpha = 20°$ is assumed for the spur gear, then the practical limits for the teeth of the face gear will be in the region of $\alpha = 0°-10°$ for $R_{min}$ and $\alpha = 30°-40°$ for $R_{max}$.

On studying FIGS. 1 and 2 originating from the known literature closely, it emerges, surprisingly, that for $R < R_2$ the toothing height of the face gear remains at the same height as the position of the base circle $R_b$ of the spur gear. This is in spite of the fact that, as FIG. 2 clearly shows, for radii smaller than $R_2$ the pressure angle $\alpha$ becomes smaller than the initial value (of, for example, 20°). However, as will be discussed below in connection with FIG. 3, this should lead, according to the known gear wheel theory, to local undercutting of the tooth bases of the spur gear 1 at those points over the tooth width which correspond to the radii concerned of the face gear. However, this is not the intention of this type of gear wheel drive because the starting point is the use of a normal cylindrical (spur) gear wheel. This means that the necessary corrections and/or adaptations must be made on the toothing of the face gear. It will emerge on the basis of the discussion of FIG. 3 that it is impossible for the known wheels depicted in FIGS. 1 and 2 and copied from the handbooks to operate correctly as depicted. The assumption is justified that the lightly loaded face gears used in practice are of such cheap quality that the consequences of the incorrect shaping are not perceived as such as a result of the pitch faults, oscillations, elasticity of wheels, shafts and bearings, and the like, which are also present; the unevenness of the rotation resulting from this does not necessarily always have to be troublesome. It is also possible that the face gears actually constructed have a relatively small tooth width and/or a smaller tooth height T than the wheels depicted in FIGS. 1 and 2.

FIG. 3 shows diagrammatically a known chapter of gear wheel theory, which states that the tooth top height T of the teeth of the face gear 2 must not project above the point T where the perpendicular to the rack profile at the point where the latter intersects the working pitch line $R_2$, intersects the base circle $R_b$ of the spur gear 1. This relates, of course, to the active tooth surface. If said active tooth surface of the rack were to come above the height T, then this would irrevocably lead to undercutting of the tooth base of the spur gear 1. Of course, it is possible to round off the rack-face-gear tooth above the height T provided it runs free of the rounding off at the tooth bases up to the tooth base circle $R_v$ of the spur wheel 1. This rounding off is shown as a dotted line by 6.

The theory described above according to FIG. 3 is valid for various pressure angles $\alpha$. Shown in FIG. 3 is a pressure angle of 20°, but with increasing pressure angle the height T will increase so as to result, if the pressure angle $\alpha$ increases further, in a pointed tooth, while if the pressure angle $\alpha$ decreases, the height T decreases until, as $\alpha = 0°$, T also becomes equal to 0. Based on the fundamental properties of an involute tooth shape, it further emerges that at radii of the face gear smaller than and greater than the pitch circle $R_2$, the tooth flank of the spur gear, with its constant pressure angle $\alpha$ (of, for example 20°) over the tooth width, interacts with a mathematically precise involute tooth flank on the face gear, which has, however, a pressure angle differing from the pressure angle of the spur gear wheel. This theory therefore states that the toothing of the face gear 2 can also have only a maximum tooth height above the working pitch line (above the pitch circle $R_2$) which is equal to T in order to avoid a necessary tooth base undercutting in the spur gear 1. From this it follows that with the known varying pressure angle $\alpha$ over the width of the face gear tooth the height T of the face gear tooth should also vary at the same time. Surprisingly, as already stated earlier, this is not the case in the face gears according to the prior art which have been depicted and discussed. In FIG. 3 an involute toothing is depicted having a pressure angle of $\alpha = 20°$, because this angle is the most common, and in particular, at the position of the pitch diameter $R_2$ of the face gear. The rack shown may be regarded as the flattened out circumference of the face gear 2 at $R_2$. (For simplicty the tip and base roundings have been omitted). $R_v$, $R_b$, $R_1$, $R_T$ and P indicate respectively the root circle, the base circle, the pitch circle, the tooth tip circle and the length of contact of the spur gear 1. At said radius $R_2$ the face gear also has a pressure angle $\alpha = 20°$. The effective active tooth flanks are hatched. As is known, they are not equally long. Clean rolling only takes place at the working pitch line ($R_2$), with also some slipping at either side.

At other radii greater and less than the pitch circle $R_2$ the same occurs, the pressure angle of the spur gear remaining $\alpha = 20°$, but that of the face gear being greater or less than 20°. Clean rolling continues to occur at the working pitch line ($R_2$) and also some slipping in addition. It will be clear that the extent of slipping increases as the pressure angle differs further from $\alpha = 20°$ and as the tooth tip height T increases. Potential problems with increasing slipping, particularly at high tooth loading and high slip speeds (rotary speeds), can be kept completely under control by means of suitable lubrication.

Figure 5:
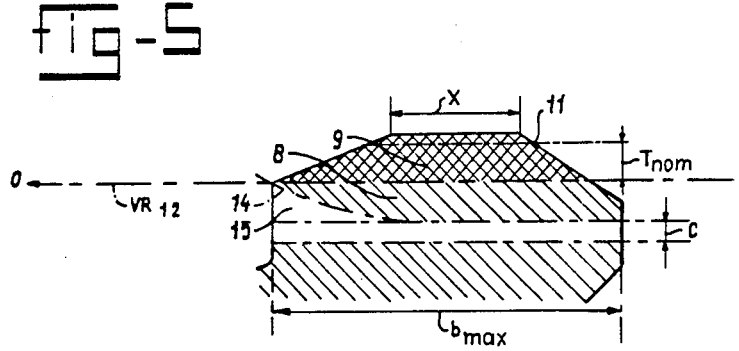
FIG. 5 shows diagrammatically the tooth shape of the face gear.

The invention results in the tooth shape for the face gear shown in FIGS. 4 and 5. In FIG. 4a a side view over the width b of a tooth is shown on an enlarged scale. The top-base play between the tooth tip of the spur gear 1 and the tooth base of the face gear 2 is indicated by c. The hatching 7 shows the base material of the face gear which has been cut through. The shading 8 of the tooth flank surface is the surface known from the literature but which has been corrected in a manner such that it complies with the theory described above. It has thereby fundamentally become suitable for limited powers. However, it provides only a very limited effective bearing area. The shading 9 shows the additional active surface according to the invention. Towards small radii ($R_{min} < R_2$) the additional tooth height decreases to zero for a pressure angle of $\alpha = 0°$. This part of the tooth will generally not be used and the tooth will terminate at the arbitrarily indicated line 10, where the pressure angle $\alpha$ is approximately 5°. Something corresponding applies for radii greater than $R_2$ where the tip becomes higher until the tooth tip is sharp at point 11, after which it again decreases with the tip of the tooth remaining sharp as the radius, pressure angle $\alpha$ and tooth base width increase. In practice the tooth width will be chosen to terminate at, for example, the line 12 because, inter alia, the relative slip speeds between the tooth flanks may go into the danger zone at that point. This is, of course, dependent on maximum, mean and impact loading, circumferential speeds, material choice, machining accuracy, surface condition, required service life in relation to weight, etc.

In FIG. 4b the total tooth sections are shown along with associated pressure angle $\alpha$ and tooth tip height $T_\alpha$ and $T_{nom}$ for a number of points over the tooth width. The broken line 13 indicates the point where the active tooth flank surface merges into the rounding towards the root circle. For small radius R the line 13 rises progressively along 14 as a result of which the tooth flank surface indicated by 15 also becomes inactive and the effective surface 8 according to the corrected prior art thereby decreases still further. The gain in effective surface 9 as a percentage thereby becomes all the more important.

At the same time it emerges that the tooth shapes depicted diagrammatically in FIGS. 4a and 4b have only limited validity, viz. assuming a pressure angle of $\alpha = 20°$ for the spur gear, for a transmission ratio i up to i < approximately 5–7.

For a transmission ratio of i < approximately 5–7 the tooth profile looks approximately as in FIG. 5. Over a width X the tooth tip may remain at a maximum height T, which again means an increase in the effective surface of the tooth flanks of the face gear. Of course, the above values are only indicative because they are dependent on the general gear wheel variables according to the theoretical rack profile used, such as straight-/helical toothing, intersecting/crossing axes, and the like.

What is claimed is:
1. Face gear transmission comprising:
   a cylindrical gear wheel having a first axis, said cylindrical gear wheel engaging in substantially continuous line contact with a face gear having a second axis not parallel to said first axis;
   said face gear having a teeth crown, said teeth crown having active tooth flanks over an active pressure angle $\alpha$ varying as a function of teeth crown radius, the range of variation of said pressure angle being a range within the range of $\alpha = 0°$ and approximately $\alpha = 40°$;
   said face gear teeth having an axial height varying as a function of pressure angle $\alpha$ and extending at least into a plane disposed on a pitch cone located about said second axis, said axial height decreasing substantially linearly from a nominal tooth height as the pressure angle α decreases, and said axial height increasing as the pressure angle α increases, said axial height increasing to a sharp tip point and then decreasing outwardly therefrom.

2. A face gear transmission as in claim 1 wherein said first and second axes intersect.

3. A face gear transmission as in claim 1 wherein said first and second axes intersect at 90°.

4. A face gear transmission as in claim 1 wherein said cylindrical gear wheel has straight teeth.

5. A face gear transmission as in claim 1 wherein said cylindrical gear wheel has helical teeth.

6. A face gear transmission as in claim 1 wherein said cylindrical gear has a standardized pressure angle α=20° and a transmission ratio i less than approximately 5-7, said axial tooth height increasing over the tooth width with a radius increasing from the inside until it becomes pointed and then immediately decreasing.

7. Face gear transmission comprising:

a cylindrical gear wheel having a first axis, said cylindrical gear wheel engaging in substantially continuous line contact with a face gear having a second axis not parallel to said first axis;

said face gear having a teeth crown, said teeth crown having active tooth flanks over an active pressure angle α varying as a function of teeth crown radius, the range of variation of said pressure angle being a range within the range of α=0° and approximately α=40°;

wherein said cylindrical gear has a standardized pressure angle α=20° and a transmission ratio i of approximately greater than 5-7, said face gear teeth having an axial height varying as a function of pressure angle α and extending at least into a plane disposed on a pitch cone located about said second axis, said axial height decreasing substantially linearly from a nominal tooth height as the pressure angle α decreases, and said axial tooth height increasing to a maximum height determined by said engaging cylindrical gear wheel, then remaining constant until it becomes pointed and finally decreasing.

* * * * *